US011520554B2

(12) United States Patent
Britton

(10) Patent No.: US 11,520,554 B2
(45) Date of Patent: Dec. 6, 2022

(54) DIGITAL DÉCOR DEVICE

(71) Applicant: Kyle Britton, Huber Heights, OH (US)

(72) Inventor: Kyle Britton, Huber Heights, OH (US)

( * ) Notice: Subject to any disclaimer, the term of this patent is extended or adjusted under 35 U.S.C. 154(b) by 0 days.

(21) Appl. No.: 16/868,421

(22) Filed: May 6, 2020

(65) Prior Publication Data

US 2021/0349674 A1   Nov. 11, 2021

(51) Int. Cl.
*G06F 3/14* (2006.01)
*G06F 3/147* (2006.01)
*G06F 21/31* (2013.01)
*G06F 16/538* (2019.01)
*G06F 16/535* (2019.01)

(52) U.S. Cl.
CPC .......... *G06F 3/1454* (2013.01); *G06F 3/147* (2013.01); *G06F 16/535* (2019.01); *G06F 16/538* (2019.01); *G06F 21/31* (2013.01)

(58) Field of Classification Search
CPC .................................................. G06F 16/538
See application file for complete search history.

(56) References Cited

U.S. PATENT DOCUMENTS

| | | | | |
|---|---|---|---|---|
| 2009/0310028 A1* | 12/2009 | Sadri | ................. | H04N 21/6543 348/718 |
| 2011/0309946 A1* | 12/2011 | Jonsson | ............ | H04M 1/72448 340/686.6 |
| 2012/0249577 A1* | 10/2012 | Sukenori | .............. | G11B 27/105 345/619 |
| 2014/0009453 A1* | 1/2014 | Liu | ...................... | G09G 3/3225 345/76 |
| 2019/0220343 A1* | 7/2019 | Park | ................... | H04N 21/4424 |
| 2019/0384394 A1* | 12/2019 | Cruz Hernandez | ..... | G06F 3/017 |

OTHER PUBLICATIONS amazon.com : Nixplay Original 15 Inch Digital WiFi Photo Frame W15A—Wall-Mountable Digital Picture Frame with Motion Sensor and Storage. Internet Product Listing—Sep. 4, 2019.
amazon.com : Pix-Star 10.4 Inch Wi-Fi Cloud Digital Photo Frame FotoConnect XD with Email, Online Providers, iPhone & Android app. Internet Product listing Sep. 4, 2019.
Crutchfield: Meural Canvas powered by NetGear. Smart/Digital Art Frame-Rotating Gallery. Item # 941MC227BL Internet product listing. Sep. 4, 2019.
newegg.com: NIX Advance—10 inch Widescreen Digital Photo & HD Video (720p) Frame. Item#: 9SIA5YX5UW7450. Internet Product Listing—Sep. 4, 2019.

* cited by examiner

*Primary Examiner* — Gustavo Polo
(74) *Attorney, Agent, or Firm* — Volta Law Group

(57) ABSTRACT

A system and method for providing image display, and more specifically, a system for providing a digital image for decorating a living or work space is disclosed.

3 Claims, 5 Drawing Sheets

DIGITAL DÉCOR DEVICE

TECHNICAL FIELD

This application relates in general to a system and method for providing image display, and more specifically, to a system and method for providing a digital image for decorating a living or workspace.

BACKGROUND

Until this point, to decorate walls, people would have to hang art, posters, banners, flags, and other objects, sometimes damaging the paint and walls in the process. With the Digital Décor Device you no longer have to worry about the aesthetic of your home or workplace. Over the last couple of decades we have seen major leaps in display type from LED, LCD, and plasma to OLED and QLED where organic materials are used as the medium to produce the light in the pixels.

This device will be just a few mm thick and feature a flexible outer shell and OLED display. With this product, individuals will be able to open an application on their phone and choose from preselected designs or create their own. This will allow those individuals who crave change the opportunity to update their room decoration with the tap of a button. Mounted with the use of temporary adhesives, the electrical components are housed in a small discrete box near the bottom of the image with a removable/rechargeable battery to ensure the system remains wireless. Simple Bluetooth connection may be used to sync the phone to the "poster."

Therefore, a need exists for a discrete, affordable way to display images on the walls of homes and workplaces. The images can be created through an application for phones and displayed discretely with adhesives so that no damage to surfaces occurs. The ability to change the image on a whim will satisfy today's tech-savvy design consumer.

SUMMARY

In accordance with the present invention, the above and other problems are solved by providing a system and method for providing image display, and more specifically, to a system and method for providing a digital image/art box for decorating a living or workspace, according to the principles and example embodiments disclosed herein.

In one embodiment, the present invention is a system for providing a digital image/art box for decorating a living or workspace. The system for providing a digital image for decorating a living or workspace includes a wall décor device and a mobile application for uploading the digital image to the wall décor device. The wall décor device has a display for presenting the digital image, an image driver, and a wireless interface. The mobile application for uploading the digital image to the wall décor device includes a wireless uploader, a user interface and a network interface.

In another embodiment, the present invention is a method for providing a digital image/art box for decorating a living or workspace. The method logs into a remote image server using a mobile application transmitting a user ID, when the user ID is authenticated by the remote image server, transmits a search query to the remote image server, in response to the search query, receiving one or more image descriptions of available images for download, transmits a selected image from the one or more image descriptions of available images, receives the selected image from the remote image server, stores the selected image within the mobile application, connects to a wall décor device using a wireless interface and uploads the selected image to the wall décor device for display by the wall décor device.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
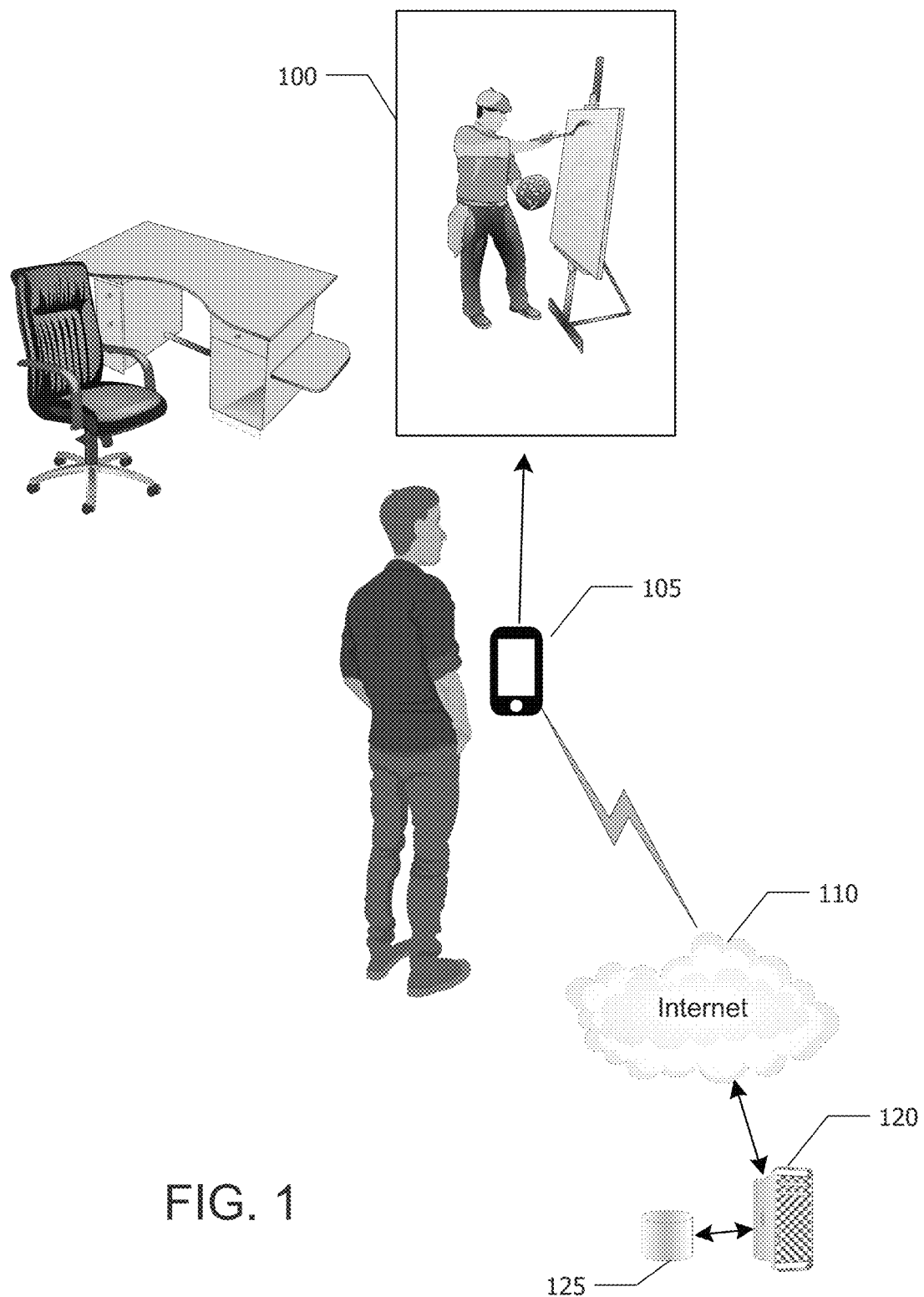
FIG. 1 illustrates an example embodiment for a device that provides a digital image for display within living and workspaces according to the present invention.

This application relates in general to a system and method for providing digital image displays and more specifically, to a system and method for providing a digital image/art box for decorating living or workspace according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly," consistent with the discussion above regarding ranges and numerical data.

The term "mobile application" refers to an application executing on a mobile device such as a smartphone, tablet, and/or web browser on any computing device.

The terms "customer," and "user" refer to an entity, e.g. a human, using the Digital Décor Device including any software or smart device application(s) associated with the invention. The term user herein refers to one or more users.

The term "connection" refers to connecting any component as defined below by any means, including but not limited to, a wired connection(s) using any type of wire or cable for example, including but not limited to, coaxial cable(s), fiberoptic cable(s), and ethernet cable(s) or wireless connection(s) using any type of frequency/frequencies or radio wave(s). Some examples are included below in this application.

The term "invention" or "present invention" refers to the invention being applied for via the patent application with the title "Digital Décor Device." Invention may be used interchangeably with image/art box, device, and décor.

In general, the present disclosure relates to a system and method for displaying images onto a discrete flexible "frame" that hangs on a wall. In order to best understand the present invention, FIG. 1 illustrates an example embodiment for a device that provides a digital image/art box for display in living and workspaces. Digital Décor Device 100 is a large display area with electronics and sufficient memory to retain a high resolution digital image corresponding to a poster, photo, artwork, print, or painting that is to be displayed in the living or workspace of a user. Digital Décor Device 100 includes wireless communication technology such as Bluetooth™, WiFi, Near Field Communication (NFC) and similar mechanisms to communicate with a mobile application in a smartphone 105.

This digital device 100 is typically frameless and just a few mm thick. The digital décor 100 may include a flexible outer shell and OLED display. Typically, the digital image 100 will hang on a wall through the use of adhesives. The electrical components will be housed in a discrete box near the bottom of the image with a removable/rechargeable battery to ensure the system remains wireless. A simple Bluetooth™ connection may be used to sync the smartphone, tablet or web browser to the device. Of course, other power sources and communication protocols may be used.

With a corresponding mobile application 105a on a smartphone, tablet or web browser, a user may choose from preselected designs or create an original design. This mobile application 105a will allow those individuals who crave change the opportunity to update their room décor on a digital display 100 with the tap of a button.

In some embodiments, the digital décor device 100 and the mobile application 105a may use images contained within the mobile application 105a and any images the user may create. In other embodiments, the mobile application 105a may communicate with a remote image server 120 over the Internet 110 to permit the user to search a database 125 of stored images to find and download a desired image for upload to the digital décor device 100.

The server 120 may utilize a user account mechanism to authenticate and then authorize the user to search and download the desired images. The user may purchase a subscription from the server 120 operator for a nominal fee and the images provided for download may be properly licensed by the server 120 operator for use on these devices by users. The subscription service may also include various collections of images, such as sports, iconic travel locations, wildlife, movies, and any other classification that may be created. Other mechanisms to provide royalty free images and other licensed images may be used as desired. The user may update the image on the digital décor device 100 as often as he or she wishes. In some embodiments, the digital décor device 100 may store multiple images within its memory and display a particular image according to a predefined schedule.

Figure 2:
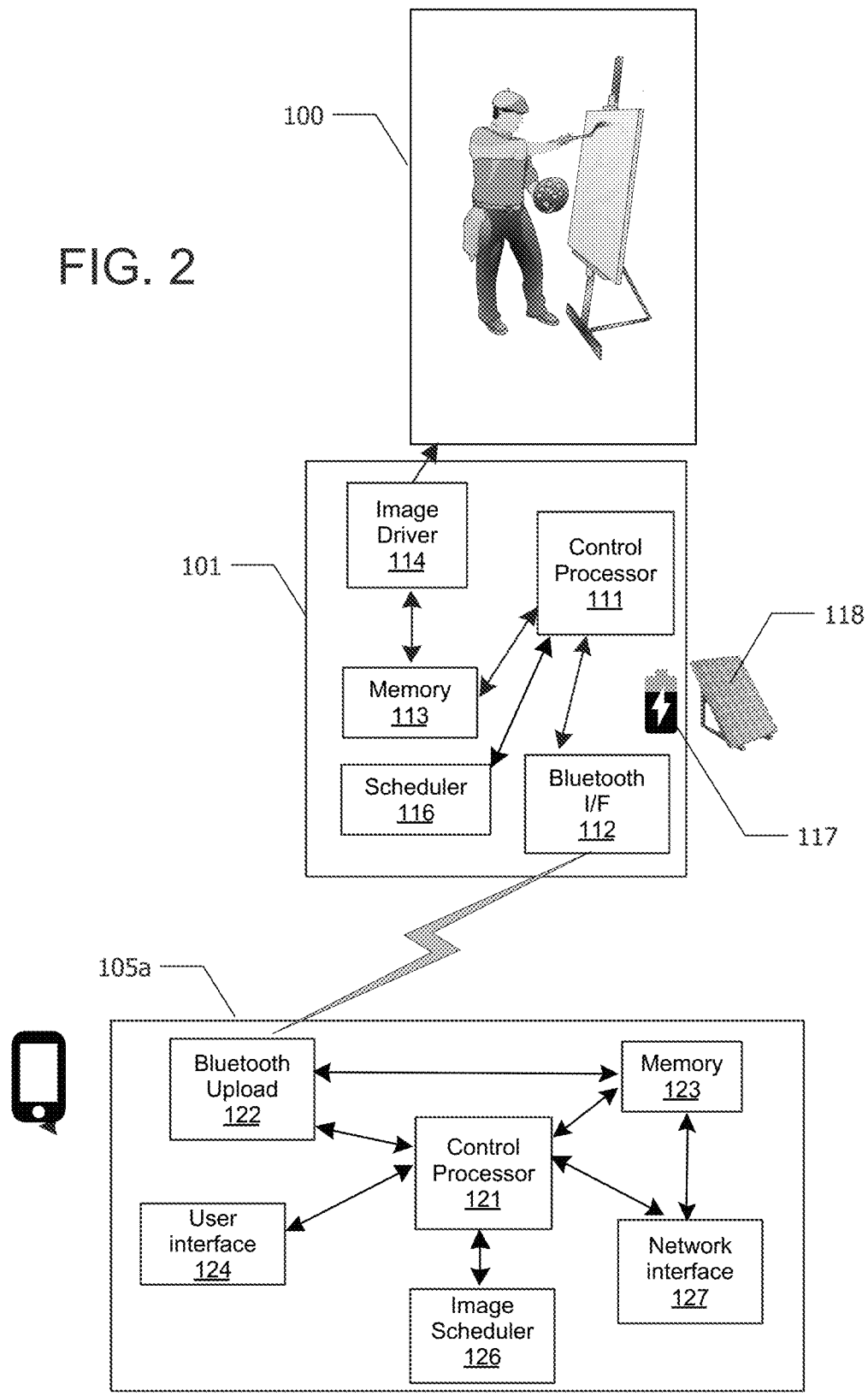
FIG. 2 illustrates another example embodiment of a system providing a digital image for decorating living or workspace according to the present invention.

FIG. 2 illustrates another example embodiment of a system providing a digital image for decorating living or workspace according to the present invention. A Digital Decor Device 100 is shown with its electronic components and the mobile application 105a with its components. Components from the two devices work together to provide the digital décor device 100 its functionality.

The Digital Décor Device includes the display 100, a control processor 111, a Bluetooth™ interface 112, memory 113, an image driver 114, and a scheduler 116. The device 100 may also have a battery 117 to power the digital display and its electronics. The battery 117 may be charged using a solar cell 118 or other power source. As noted above, the display 100 is typically a large, frameless display device that contains a digital image. In a preferred embodiment, the display 100 may be an OLED display having a resolution of 4k UHD (3840×2160) or 4k DCI (4096×2160). Other resolutions and other display types may also be used depending upon the size and availability of display devices.

The control processor 111 performs all of the logical operations needed to upload an image, accept a display schedule, communicate with a mobile application 105a, and display images as instructed. In a typical embodiment, this control processor may be an embedded programmable processing device that executes firmware stored within its memory 113. In other embodiments, the control processor may be an application specific integrated circuit (ASIC) that includes logic and a state machine to accept commands from the mobile application and to perform a set of operations using the state machine sequence to initiate any operation. The choice of the control processor 111 may be made depending upon the complexity of the functions performed by the digital décor device 101 and available power to operate the electronics.

The Bluetooth™ interface 112 provides the RF transceiver and communication protocol logic needed to communicate with the mobile application 105a on the smartphone 105. The interface 112 performs all necessary data formatting and data transmission and reception to send and receive data needed to operate the device 101 and receive image data from the mobile application 105a.

The device 101 includes a block of memory 113 for use in operating the electronics within the device. A portion of the memory 113 will retain one or more data objects containing the image to be displayed by the device 101. Another portion of the memory 113 may contain a set of software instructions that are used by the control processor 111 to perform its operations. A final portion of memory may contain operating parameters such as network IDs to communicate with the mobile application 105a, schedule information if the scheduler 116 is used to periodically change the image displayed by the device 101, and similar data values used within the device 101 to operate.

The image driver 114 retrieves image data from the memory 113 and passes the data to the display device according the format needed by the particular device. The image driver 114 is also responsible for controlling the image resolution and ensuring the image data matches a selected resolution.

Lastly, the scheduler 116 maintains a clock timer and a schedule of image display parameters that instruct the image driver 114 which image data object is to be used at any given time to be displayed by the device. The scheduler 116 receives schedule data from the mobile application 105a in which the user defines and/or edits a desired display schedule. Once a schedule is completed, it may be uploaded to the scheduler 116 for use as defined. The scheduler may also receive data and time data updates when communicating with the mobile application to permit the clock timer within the scheduler to remain accurately set to the current date and time.

A simplified embodiment of the mobile application 105a is also shown in FIG. 2. The mobile application 105a includes a control processor 121, a Bluetooth™ uploader 122, memory 123, a user interface 124, and a network interface 125 for communicating with the server 120 over the Internet 110. The control processor 121 processes user commands and initiates data communication with the digital décor device 101 and with the server 120 via the Internet 110. The control processor sends and receives data and command packets with the remote devices. Data received by the control processor 121 is forwarded to other components within the mobile application 105a as required and stores the data within memory 123 for later use as needed.

The Bluetooth™ uploader 122 provides the RF transceiver and communication protocol logic needed to communicate with the digital device 101 using the smartphone 105 Bluetooth™ hardware. The uploader 122 performs all necessary data formatting and data transmission and reception to send and receive data needed to support the mobile application 105a and receive image data users and remote sources.

The mobile application 105a utilizes a block of memory 123 available on the smartphone 105 for use in operating the software components within the mobile application. A portion of the memory 123 will retain one or more image data objects containing the image to be displayed by the device 101. Another portion of the memory 123 may contain a set of software instructions that are used by the control processor 121 to perform its operations. A final portion of memory may contain operating parameters such as network IDs to communicate with the digital décor device 101 and the remote server 120, schedule information if the scheduler 116 in the device 101 is used to periodically change the image displayed by the device 101, and establish similar data values used within the mobile application 105a to operate.

The user interface 124 uses the touch screen of the smartphone 105 to provide the user with a mechanism to control the mobile application. The user interface 124 displays information for the user to view on the touch screen. The user interface 124 also accepts input commands from the user that initiate operations to be performed by the mobile application 105a. The user interface 105a uses the supported hardware and corresponding software application program interfaces (APIs) to provide the interface for the user to interact with the mobile application 105a.

Lastly, the network interface 125 provides a mechanism for the mobile application 105a to communicate with remote devices over the Internet 110. This network interface 125 also uses the supported hardware and corresponding software APIs to provide the network communications needed to interact with the remoted devices such as server 120.

Figure 3:
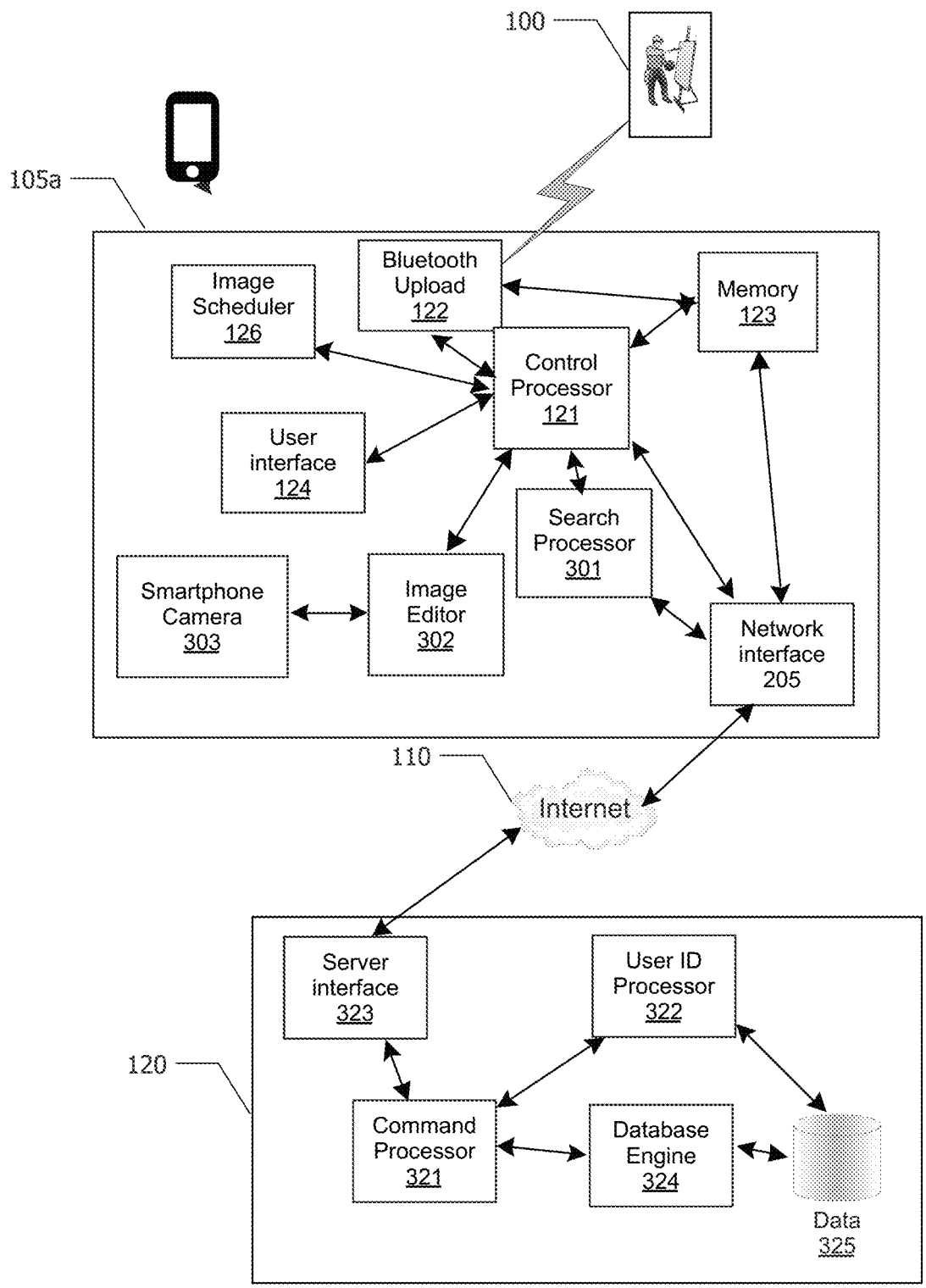
FIG. 3 illustrates another example embodiment of a system for providing a digital image for decorating living or workspace according to the present invention.

FIG. 3 illustrates another example embodiment of a system for providing a digital décor device for decorating living or workspace according to the present invention. In this embodiment, the components of the mobile application 105a and the remote image server 120 are illustrated. The mobile application 105a includes all of the components discussed above with reference to FIG. 2 that perform the functions described therein. The mobile application 105a further includes a search processor 302, an image editor 302, and a smartphone camera 303.

The search processor 302 communicates with the server 120 to search for and download images for display on the digital décor device 101. The search processor 302 is responsible for communicating, creating, and managing a user account permitting the mobile application 105a to search for and download images. Additionally, the search processor 302 receives user commands from the user interface 124, such as search requests, search keywords, and the like, sent to the server for searching available images. The search processor 302 receives results from a search request that are presented to the user via the user interface 124. These search results may include both text description data as well as lower resolution images for display on the smartphone 105 screen. When a user selects an image for download, the search processor 302 sends the request to the server 120 and receives the high resolution image which is stored into memory 123 for eventual upload to the digital décor device 101.

The image editor 302 provides a mechanism for the user to edit and modify images to create unique images for display by the device 101. The image editor 302 typically allows users to crop images, adjust color and exposure of images, add text and similar graphic content, and other similar operations. The image editor may also assist in importing images created by the user on other computing platforms to take advantage of any other image creation and modification programs available to users.

The smartphone camera 303 uses the supported camera hardware and corresponding software APIs of the smartphone 105 to provide the mobile application 105a with a mechanism to acquire and use images generated by the camera. Using the available APIs, the mobile application 105a may utilize any available features of the smartphone 105 that are available to developers for use in mobile applications.

The server 120 provides searching and downloading of available images to users of the mobile application 105a. The server 120 includes a command processor 321, a user ID processor 322, a server interface 323, a database engine 324, and data storage 325.

The command processor 321 receives image search requests and image download requests from the mobile application 105a. The command processor 321 authenticates the user with the assistance of the user ID processor 323 and submits search queries to the database engine 324. The database engine 324 returns search results to the command processor 321 which are processed and forwarded to the mobile application 105a. The command processor 321 also receives the image download request from the mobile application 105a. This request is sent to the database engine 324 to obtain a copy of the high resolution image requested that is returned to the mobile application 105a upon retrieval from the data storage 325. The command processor may also provide operation and maintenance processors that set up, modify, and update the image database, the user ID database, and other server support functions.

The user ID processor 322 handles the authentication of the user ID to permit a mobile application 105a to request a search and image download. The user ID processor 322 maintains a user ID database along with passwords, challenge questions, multi-path authentication data such as cell phone numbers and email addresses, and groups of image authorization data to identify what images in the image database may be accessed by a particular user. Search requests and image download requests will require the user ID processor 322 to authenticate the mobile application 105a and determine which images may be obtained from the image database. This authentication may be performed on each request, upon login for a session of searching, or other authentication processes desired by the server 120 operator to ensure license- and royalty-free images are sent to the mobile application 105a and non-licensed images are not.

The server interface 323 provides a mechanism for the server 120 to communicate with remote smartphone devices over the Internet 110. This server interface 323 uses the supported hardware and corresponding software APIs from the server operating system and related network components to provide the network communications needed to interact with the remote devices such as smartphone 105.

The database engine 324 receives and processes image search queries forwarded from the control processor 321 to obtain search results based upon user requests. The database engine 324 also retrieves high resolution images requested by users enabling their transfer over the Internet 110. The database engine 324 manages all search indexes when images are added and removed from the database to maintain an optimal search process when users submit queries for processing.

The data storage 325 is a mass storage device attached to the server 120 for storing data for all of the other components. The data storage 325 typically holds the image database with its search indexes, the user ID database with its authorization information for various groups of images, and all other server parameters and system variables used to support the server's operation and communication with mobile applications 105a.

Figure 4:
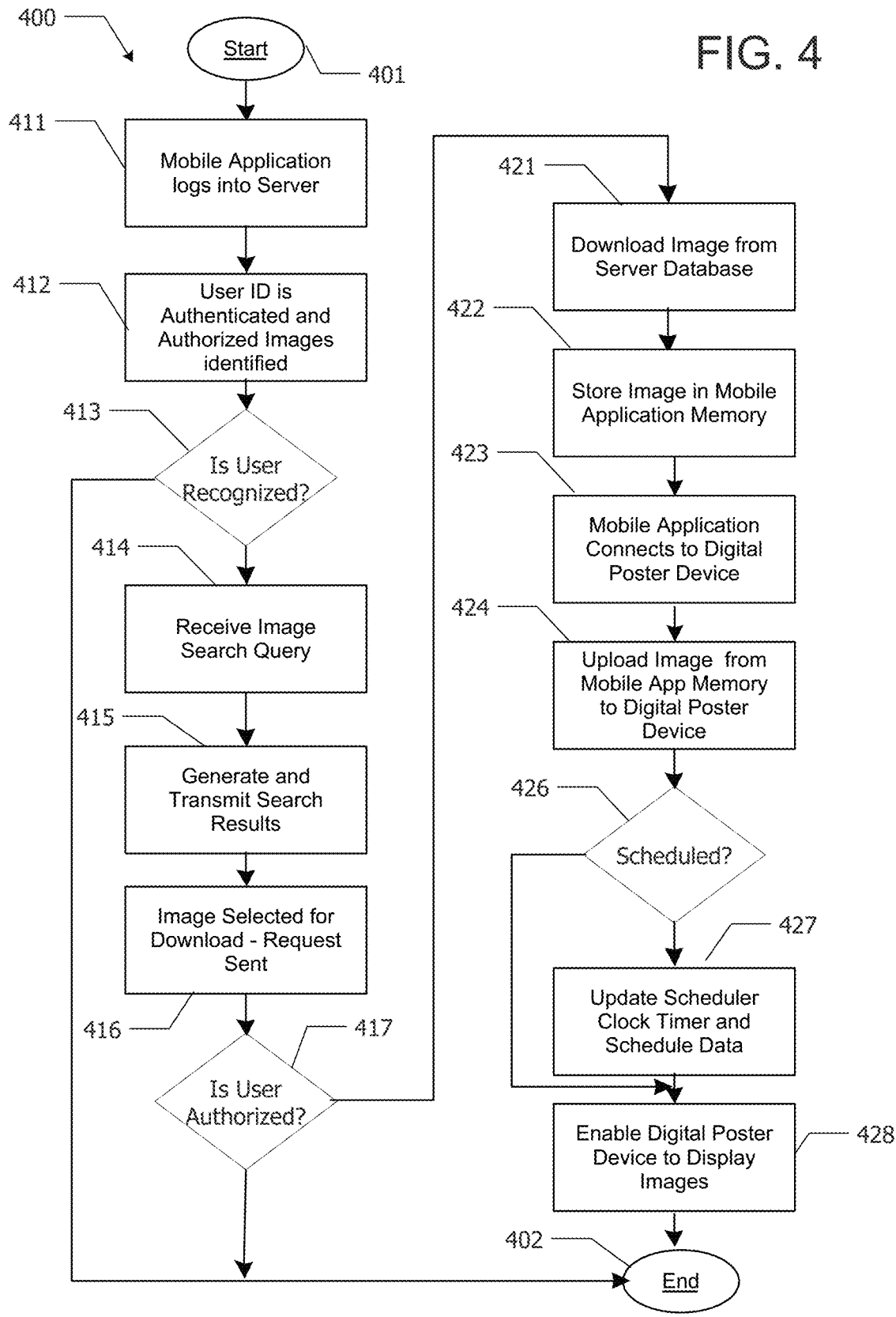
FIG. 4 illustrates a flowchart of operations for providing a digital image for decorating living or workspace according to the present invention.

FIG. 4 illustrates a flowchart of operations for providing a digital décor device for decorating living or workspace according to the present invention. The process 400 begins 401 and step 411 causes the mobile application 105a to log into the server 120. The user ID is authenticated, and authorized images are identified in step 412. Test step 413 determines if the user was properly authenticated, and if not, the process ends 402.

If test step 413 determines that the user is recognized and authorized to access the image database, the mobile application 105a submits an image search query in step 414. The server 120 generates a set of search results that are received by the mobile application 105a. The mobile application 105a presents the search results to the user on the smartphone 105 and the user instructs the mobile application 105a to download a particular image, sending an image download request in step 416. Test step 417 determines whether the user is authorized to download the selected image, and if not, the process ends 402.

When test step 417 determines that the user is authorized to download the selected image, step 421 downloads the image to the mobile application 105a. The downloaded image is stored in step 422 into the memory of the smartphone 105. Next the mobile application 105a connects to the digital décor device 101 via a Bluetooth™ connection in step 423. The image is uploaded by the mobile application 105a to the digital device 101.

Test step 426 determines if the image uploaded is part of a schedule, and if so, step 427 updates the clock timer and schedule data before enabling the digital décor device 101 to display the images. When test step 426 determines that the uploaded image is not part of a schedule, but rather to be displayed and manually changed, the process immediately enables the display of the image by the digital device 101 in step 428. Once step 428 has enabled the image to be displayed, the process ends 402.

Figure 5:
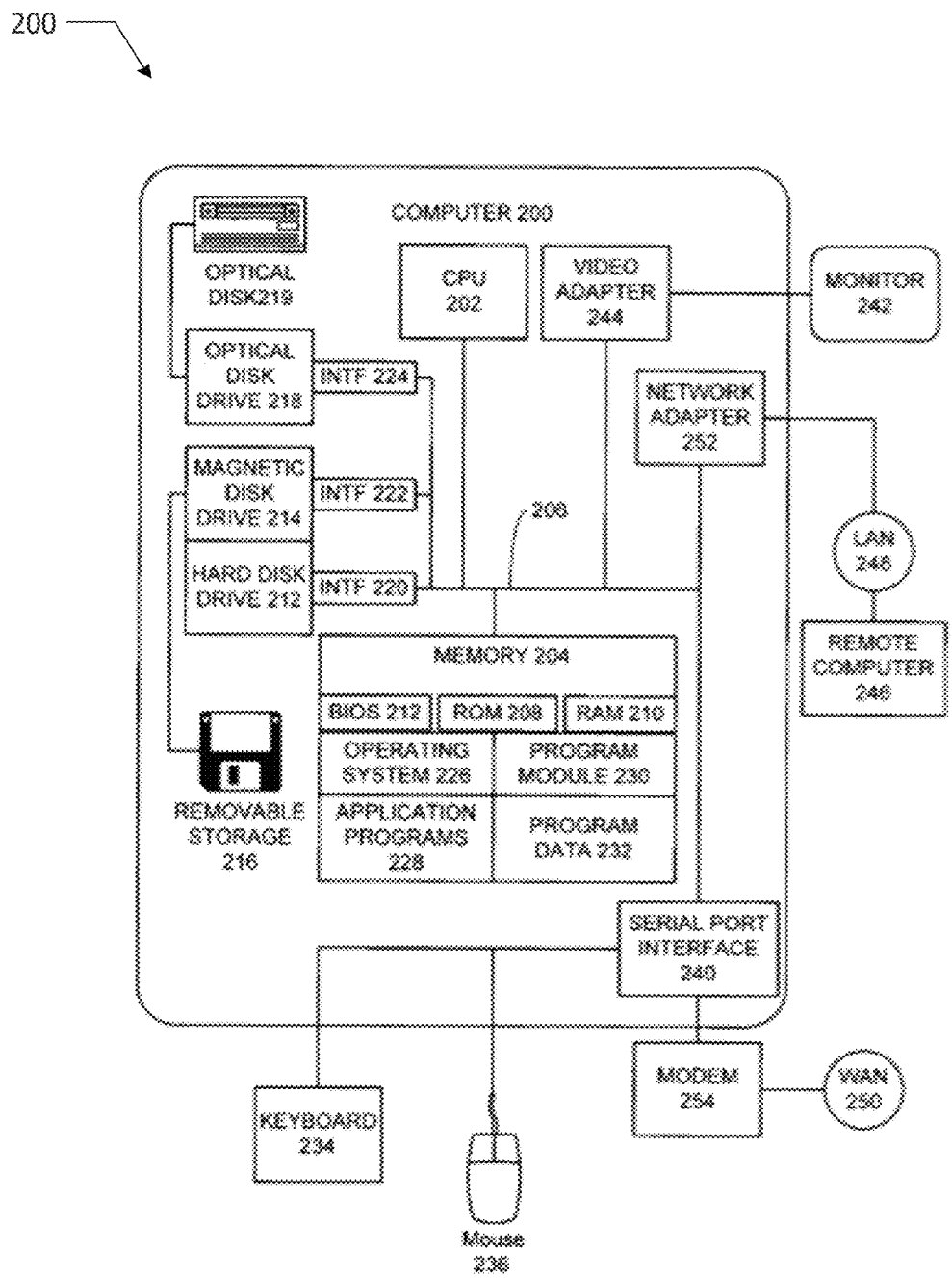
FIG. 5 illustrates a generalized schematic of a programmable processing system utilized as the various computing components described herein to implement an embodiment of the present invention.

FIG. 5 illustrates a generalized schematic of a programmable processing system utilized as the various computing components described herein to implement an embodiment of the present invention.

The central processing unit ("CPU") 202 is coupled to the system bus 204. The CPU 202 may be a general-purpose CPU or microprocessor, graphics processing unit ("GPU"), and/or microcontroller. The present embodiments are not restricted by the architecture of the CPU 202 so long as the CPU 202, whether directly or indirectly, supports the operations as described herein. The CPU 202 may execute the various logical instructions according to the present embodiments.

The computer system 200 also may include random access memory (RAM) 208, which may be synchronous RAM (SRAM), dynamic RAM (DRAM), synchronous dynamic RANI (SDRAM), or the like. The computer system 200 may utilize RANI 208 to store the various data structures used by a software application. The computer system 200 may also include read only memory (ROM) 206 which may be PROM, EPROM, EEPROM, optical storage, or the like. The ROM may store configuration information for booting the computer system 200. The RAM 208 and the ROM 206 hold user and system data, and both the RAM 208 and the ROM 206 may be randomly accessed.

The computer system 200 may also include an input/output (I/O) adapter 210, a communications adapter 214, a user interface adapter 216, and a display adapter 222. The I/O adapter 210 and/or the user interface adapter 216 may, in certain embodiments, enable a user to interact with the computer system 200. In a further embodiment, the display adapter 222 may display a graphical user interface (GUI) associated with a software or web-based application on a display device 224, such as a monitor or touch screen.

The I/O adapter 210 may couple one or more storage devices 212, such as one or more of a hard drive, a solid-state storage device, a flash drive, a compact disc (CD) drive, a floppy disk drive, and a tape drive, to the computer system 200. According to one embodiment, the data storage 212 may be a separate server coupled to the computer system 200 through a network connection to the I/O adapter 210. The communications adapter 214 may be adapted to couple the computer system 200 to the network 208, which may be one or more of a LAN, WAN, and/or the Internet. The communications adapter 214 may also be adapted to couple the computer system 200 to other networks such as a global positioning system (GPS) or a Bluetooth™ network. The user interface adapter 216 couples user input devices, such as a keyboard 220, a pointing device 218, and/or a touch screen (not shown) to the computer system 200. The keyboard 220 may be an on-screen keyboard displayed on a touch panel. Additional devices (not shown) such as a camera, microphone, video camera, accelerometer, compass, and/or gyroscope may be coupled to the user interface adapter 216. The display adapter 222 may be driven by the CPU 202 to control the display on the display device 224. Any of the devices 202-222 may be physical and/or logical.

The applications of the present disclosure are not limited to the architecture of computer system 200. Rather the computer system 200 is provided as an example of one type of computing device that may be adapted to perform the functions of an image search server 120, smartphone 105, and digital display device 101 system, including servers, personal computers, and mobile devices as shown in FIGS. 1-3. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 200 may be virtualized for access by multiple users and/or applications.

Additionally, the embodiments described herein are implemented as logical operations performed by a computer. The logical operations of these various embodiments of the present invention are implemented (1) as a sequence of computer-implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps or modules.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics. Shouldn't this be section 0013?

What is claimed:

1. A system for providing image display, and more specifically, a system for providing a digital image for decorating a living or workspace, the system comprising:
   a wall décor device comprising:
      an OLED display for presenting the digital image, wherein the OLED display comprises a flexible shell;
      an image driver;
      a wireless interface;
      one or more memory devices;
      a processor configured to execute the instructions on the memory to cause the wall décor device to:
         receive one or more digital images, the one or more digital images being transmitted by a remote server and by a mobile device;
         store the one or more digital images within the one or more memory devices; and
         transmit one of the one or more digital images to the image driver for output and display on the OLED display;

a battery coupled to a solar array power source, the battery and solar array power source providing electrical power to the OLED display, the wireless interface, and the processor;
- a remote image server for providing a selection of digital images for use as the digital image on the wall decor device, the remote image server comprises:
  - a user ID processor of authenticating the mobile application to access an image database, the image database comprises one or more groups of images available to be searched according to a subscription service purchased by the mobile application, and the subscription service providing the available digital images for download in which the available digital images comprise properly licensed images and royalty free images; and
  - a database engine for searching and downloading the digital image to the mobile application;
- wherein search results of available digital images returned to the mobile application provides the available digital images authorized by the user ID processor; and
- a mobile application executing upon the mobile device for uploading the digital image to the wall décor device, the mobile application comprises:
  - a wireless uploader;
  - a user interface;
  - an image scheduler for defining a time during the day during which a particular digital image is displayed as the digital image;
  - an input camera device for capturing an input image for use as the digital image;
  - an image editor for generating a custom image from the input image for use as the digital image; and
  - network interface;
- wherein the digital image comprises one or more particular images defined by the image scheduler.

2. The system according to claim 1, wherein the mobile application further comprises:
- an image scheduler for defining a time during the day during which a particular digital image is displayed as the digital image;
- an input camera device for capturing an input image for use as the digital image; and
- an image editor for generating a custom image from the input image for use as the digital image;
- wherein the digital image comprises one or more particular images defined by the image scheduler.

3. The system according to claim 2, wherein the wall décor device further comprises a device scheduler for controlling which of the one or more particular images are displayed as the digital image using schedule data provided by the image scheduler.

* * * * *